Jan. 27, 1931.   J. D. WOOD   1,790,193
ELECTRICAL DISTRIBUTION SYSTEM
Filed Dec. 29, 1925

WITNESSES:
E. A. McCloskey
E. R. Evans

INVENTOR
Joseph D. Wood.
BY
[signature]
ATTORNEY

Patented Jan. 27, 1931

1,790,193

UNITED STATES PATENT OFFICE

JOSEPH D. WOOD, OF WOLLASTON, MASSACHUSETTS, ASSIGNOR TO WESTINGHOUSE ELECTRIC & MANUFACTURING COMPANY, A CORPORATION OF PENNSYLVANIA

ELECTRICAL DISTRIBUTION SYSTEM

Application filed December 29, 1925. Serial No. 78,255.

My invention relates to electrical distribution systems and particularly to systems embodying protective means against short-circuits or other faults.

One object of my invention is to eliminate the complicated and delicate relays heretofore employed in connection with circuit-interrupters operating upon a reversal of energy.

Another object of my invention is to provide a direct-trip attachment for a mechanically latched circuit-interrupter that operates in accordance with the direction of flow of power through the circuit-interrupter.

A further object of my invention is to provide an improved distribution system comprising a plurality of step-down transformers operating in parallel and connected to a common secondary network and circuit-interrupters associated with the respective transformers and responsive to a short-circuit in the transformer or on the primary side of the transformer and not responsive to a short-circuit in the secondary network.

In accordance with my invention, a mechanically latched circuit-interrupter, employed, for example, in connection with a low-voltage, multiple-feeder, alternating-current network, is provided with a direct-trip attachment having current and potential windings energized in accordance with the current traversing the circuit-interrupter and the potential across the terminals of the interrupter respectively, and so arranged as to actuate the interrupter only under conditions of reversed power flow therethrough. In its preferred form, the direct-trip attachment comprises a movable armature member actuated by the current winding upon a predetermined overload and locked against operation by the potential winding when the current traversing the potential winding bears a predetermined phase relation to the current in the current winding.

For a better understanding of my invention, reference should be had to the accompanying drawings, of which Figure 1 is a diagrammatic view of an electrical distribution system embodying the same;

Figure 1:
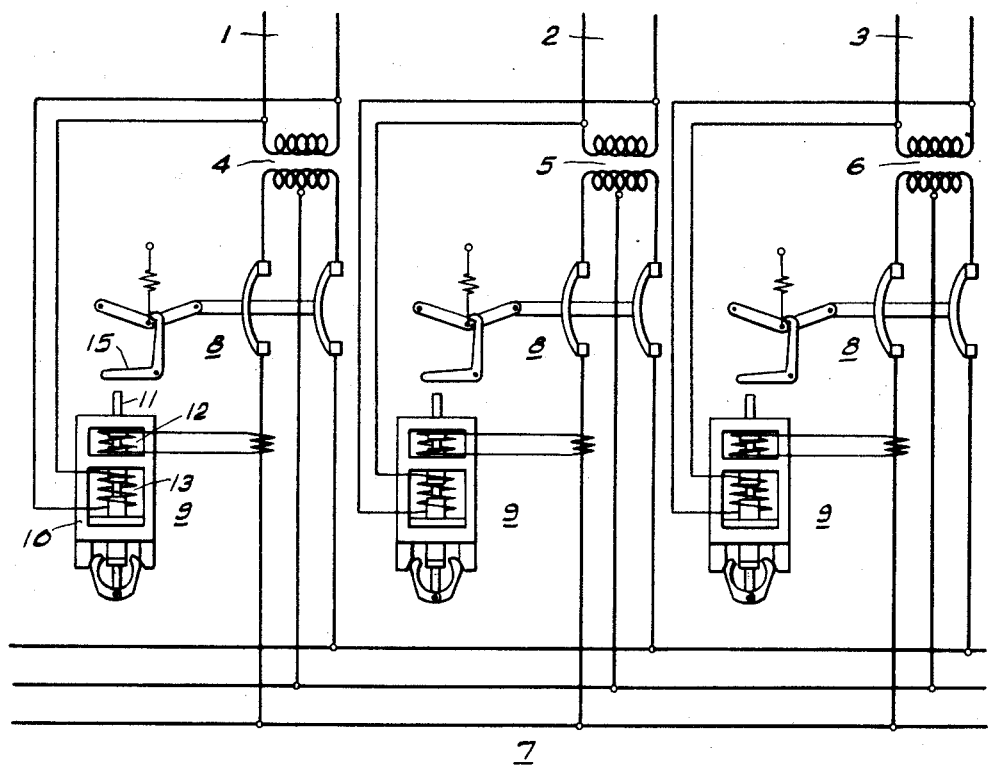

Referring to Fig. 1, an electrical distribution system comprises a plurality of supply circuits 1, 2 and 3, to which are connected step-down transformers 4, 5 and 6, having their secondary windings connected in parallel relation to a common low-voltage network 7, to which the load is connected. A circuit-interrupter 8 is provided between each step-down transformer and the secondary network in order to disconnect the supply circuit and transformer from the network when desired.

In systems of this kind, it is unnecessary to disconnect the supply circuit and transformer from the network in the case of an overload, and such disconnection would be undesirable because the overload on adjacent transformers would be increased if any transformer were disconnected. If the overload is the result of a short-circuit, the potential of the secondary network is so low and the capacity of the supply transformers in parallel is so high that the short-circuit will be burned off and thus cleared without any trouble.

However, if the short-circuit occurs upon the supply circuit or in the transformer, energy will be fed to the fault from the low-voltage network and it is necessary to disconnect the transformer and circuit.

In accordance with my invention, a tripping device 9, comprising a stationary magnetizable core member 10, a movable armature member 11 and current and potential windings 12 and 13, is provided for controlling the circuit-interrupter 8. In the case of a short-circuit on the low-voltage secondary network, the armature member 11 is locked against movement, and the circuit-interrupter 8 remains closed. In the case of a short-circuit upon the supply circuit, however, the armature member 11 is actuated to trip the latch 15 of the circuit-interrupter 8 and thus disconnect the faulty circuit.

Figure 2:
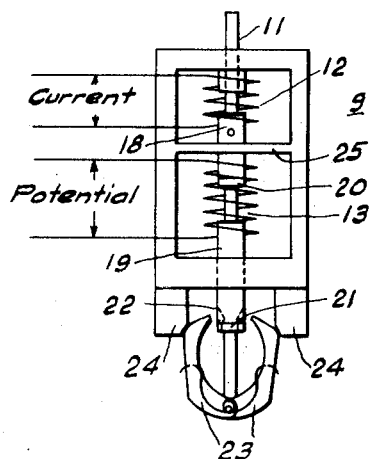
Fig. 2 is a detailed view of the tripping device shown in Fig. 1.

The detailed construction of the tripping device 9 is shown in Fig. 2. The current and potential windings 12 and 13 are mounted in spaced relation along the axis of the armature member 11. Two core members 18 and 19 are controlled by the windings 12 and 13, respectively. The core member 18 is secured to the armature member 11, and the core member 19 is adapted to move along the armature member 11 between the non-magnetic washers 20 and 21. The lower end of the core member 19 is provided with two notches 22 and two latches 23 are pivoted to the lower end of the armature member 11 in such manner as to co-operate with the notches 22 to lock the armature member under certain conditions.

If the armature member 11 is raised by means of the core member 18, the latches 23 are thrust into engagement with the core member 19 by means of projections or cam members 24 upon the core member 10, and prevent the armature member from engaging the latch member of the circuit-interrupter. If, however, the core member 19 is operated before the armature member 11 operates, the latches 23 are rendered ineffective to restrain the movement of the armature member 11. The current and potential windings 12 and 13 are wound in such directions that they do not oppose each other in the common portion 25 of the magnetic circuit when the direction of power flow in the circuit is normal. Under normal light-load or full-load conditions, neither of the windings has sufficient ampere-turns to attract the associated core member.

In the case of an overload in the secondary network, the current winding 12 picks up the core member 18 and causes the latches 23 to engage the core member 19 and restrain the movement of the armature member 11, irrespective of the value of the short-circuit current.

Under conditions of reversed power flow, however, caused by a fault in the transformer or supply circuit, the phase relation of the currents in the windings 12 and 13 is so changed that they oppose each other in the common portion 25 of the magnetic circuit and, under the joint influence of both windings, the core member 19 is quickly operated before the core member 18 has been operated to the position in which the core member 19 is locked. Consequently, the armature member 11 is not restrained and trips the latch member 15 of the circuit-interrupter to disconnect the faulty circuit.

It will be apparent that, by the use of my invention, the usual reverse-energy relay and auxiliary source of energy employed for tripping a circuit-interrupter upon a reversal of energy are eliminated. The construction of the circuit-interrupter and tripping device may be very rugged, which is of considerable advantage when the associated transformer is located at a considerable distance from a station, as is often the case. Since it is desirable to locate the step-down transformer as near the center of the load as possible, it is often located on the top of a pole or in a man-hole in the street. Under these conditions, a rugged construction of circuit-interrupter and operating mechanism is essential.

Figure 3:
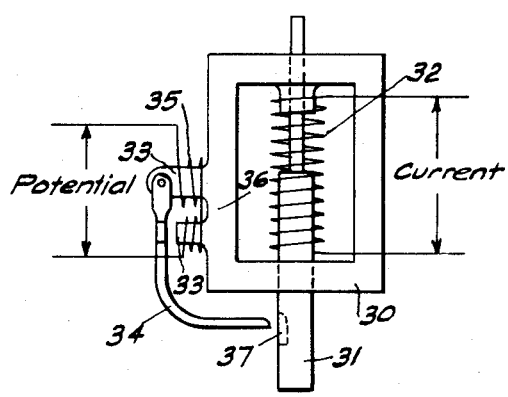
Fig. 3 is a similar view of a modified form of tripping device.

In Fig. 3 is shown a modified form of tripping device comprising a stationary magnetizable core member 30, a movable armature member 31, controlled by the current winding 32 and adapted to engage the latch of the circuit-interrupter in the same manner as that shown in Fig. 1. The core member 30 is provided with two projections 33, on one of which is pivoted a latch 34. A potential winding 35 is disposed upon the projections 33 and is normally energized in such manner that its magnetomotive force and that of the current winding 32 are opposed in the common portion 36 of the core member, so that the magnetic flux tends to traverse the latch member 34 although not sufficient to attract the latch member on account of the air gap.

If an excessive current traverses the current winding 32, however, the latch member 34 is attracted into engagement with the notch 37 in the armature member 31, and prevents the actuation of the armature member. In the case of a reversed flow of power, however, the magnetomotive force of the potential winding 35 acting upon the latch member 34 opposes that of the current winding 32, and the latch member 34 is ineffective to restrain the movement of the armature member 31. It is believed that the co-operation of the tripping device shown in Fig. 3 with a circuit-interrupter will be clear by analogy to that described above.

I consider that many changes may be made in the details of construction shown without departing from the spirit of my invention, and, accordingly, I do not desire that any limitations shall be imposed upon it except as indicated in the appended claims.

I claim as my invention:

1. A system comprising a plurality of distribution circuits connected to a common network, a circuit-interrupter in each circuit and direct-tripping means having current and potential windings so connected to the associated circuit as to trip said circuit-interrupter upon the flow of energy from said network to a faulty distribution circuit, and means for precluding operation of said tripping means during a flow of energy in a predetermined direction.

2. A tripping device for a circuit-interrupter comprising a movable armature member, a winding for actuating the same and means for locking said armature member against movement under a predetermined direction of energy flow in said winding.

3. A circuit-controlling device comprising contact members, means for latching said contact members in the operated position and electromagnetic means for tripping the latch including a movable armature member, windings for controlling said armature member and locking means for preventing the movement of said armature member under predetermined conditions.

4. A direct-trip device for an alternating-current circuit comprising a movable armature member, current and potential windings energized in accordance with the current traversing said circuit and the potential existing on said circuit, respectively, means including said windings for actuating said armature member under predetermined conditions and means including said windings for locking said armature member against movement under other predetermined conditions.

5. In combination with an alternating-current distribution system comprising a load network, a plurality of distribution transformers having the primary windings thereof connected to high-voltage supply circuits and the secondary windings thereof connected to said network by low-voltage feeders, circuit-interrupters disposed in said feeders on the network side of said transformers, and direct-tripping means for each interrupter comprising relay means including current and voltage windings energized from said system, armature means controlled by said windings and means for rendering the energization of said voltage winding ineffective when the power flow is from said supply circuit to said load network.

6. In combination with a distribution transformer having the primary winding thereof connected to a high-tension supply circuit and the secondary thereof connected to a distribution circuit, of a circuit interrupter disposed in said distribution circuit having direct-tripping means controlled in accordance with the direction and phase-angle characteristics of the energy traversing said distribution circuit, said means including current and voltage windings electrically associated with said transformer, armature means controlled thereby, and means for rendering the energization of said voltage winding ineffective.

7. In combination, a distribution circuit, a circuit-interrupter therein and direct-tripping means having current and potential windings for controlling the circuit-interrupter in accordance with the direction of the flow of energy in said circuit, and means for positively preventing action of the direct-tripping means while energy flows in a predetermined direction.

8. A direct-trip device for an alternating-current circuit comprising current and potential windings energized in accordance with the current traversing said circuit and the potential existing on said circuit, respectively, a movable armature member controlled by said windings to be actuated when energy traverses the circuit in one direction and means for locking said armature member against actuation when energy traverses the circuit in the opposite direction.

In testimony whereof, I have hereunto subscribed my name this seventeenth day of December, 1925.

JOSEPH D. WOOD.